US010657679B2

(12) United States Patent
    Shechter

(10) Patent No.: US 10,657,679 B2
(45) Date of Patent:     May 19, 2020

(54) MULTI-ENERGY (SPECTRAL) IMAGE DATA PROCESSING

(71) Applicant: KONINKLIJKE PHILIPS N.V., Eindhoven (NL)

(72) Inventor: Gilad Shechter, Haifa (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 209 days.

(21) Appl. No.: 15/551,701

(22) PCT Filed: Feb. 24, 2016

(86) PCT No.: PCT/IB2016/050988
§ 371 (c)(1),
(2) Date: Aug. 17, 2017

(87) PCT Pub. No.: WO2016/142796
PCT Pub. Date: Sep. 15, 2016

(65) Prior Publication Data
US 2018/0025515 A1     Jan. 25, 2018

Related U.S. Application Data

(60) Provisional application No. 62/130,002, filed on Mar. 9, 2015.

(51) Int. Cl.
*G06K 9/00* (2006.01)
*G06T 11/00* (2006.01)

(52) U.S. Cl.
CPC .......... *G06T 11/008* (2013.01); *G06T 11/006* (2013.01); *G06T 2211/408* (2013.01); *G06T 2211/421* (2013.01)

(58) Field of Classification Search
None
See application file for complete search history.

(56) References Cited

U.S. PATENT DOCUMENTS 10,282,820 B2    5/2019  Goshen
2013/0266115 A1  10/2013 Fan
(Continued)

FOREIGN PATENT DOCUMENTS

WO    2005/009206    2/2005
WO    2007/029129    3/2007
(Continued)

OTHER PUBLICATIONS

Brown et al., "Acceleration of ML iterative algorithms for CT by the use of fast start images," Proc. SPIE 8313, (2012).
(Continued)

*Primary Examiner* — Atiba O Fitzpatrick
(74) *Attorney, Agent, or Firm* — Larry Liberchuk

(57) ABSTRACT

A method includes generating a material landmark images in a low and high energy image domain. The material landmark image estimates a change of a value of an image pixel caused by adding a small amount of a known material to the pixel. The method further includes generating an air values image in the low and high energy image domain. The air values image estimates a value for each image pixel where a value of a pixel is replaced by a value representing air. The method further includes extracting from de-noised low and high images generated from the low and high line integrals, a material composition of each image pixel based on the material landmark images and air values image. The method further includes generating a signal indicative the extracted material composition.

21 Claims, 8 Drawing Sheets

(56) References Cited

U.S. PATENT DOCUMENTS

2013/0266198 A1* 10/2013 Pereira .................. G06T 7/0012
  382/131
2014/0133719 A1   5/2014 Wu
2014/0198892 A1*  7/2014 Yamakawa ............ A61B 6/032
  378/4

FOREIGN PATENT DOCUMENTS

WO    2012/147004    11/2012
WO    2014/128595     8/2014

OTHER PUBLICATIONS

Kuidong, et al., "Integrated correction for Cone-Beam Computed Tomography artifacts based on Digital Radiography model", Imaging Systems and Techniques, 2009.

Alvarez, et al., "Energy selective reconstructions in X-ray computerized tomography", Phys. Med. Biol. 21, pp, (1976).

Shechter, et al., "Accurate material quantification in dual energy CT", Phys. of Med. Imaging, 8313, (2012).

* cited by examiner

MULTI-ENERGY (SPECTRAL) IMAGE DATA PROCESSING

CROSS REFERENCE TO RELATED APPLICATIONS

This application is the U.S. National Phase application under 35 U.S.C. § 371 of International Application No. PCT/IB2016/050988, filed Feb. 24, 2016, published as WO 2016/142796 on Sep. 15, 2016, which claims the benefit of U.S. Provisional Patent Application No. 62/130,002 filed Mar. 9, 2015. These applications are hereby incorporated by reference herein.

FIELD OF THE INVENTION

The following generally relates to multi-energy (spectral) image data processing and is described with particular application to computed tomography (CT); however, the following is also amenable to other spectral imaging modalities.

BACKGROUND OF THE INVENTION

Projection domain decomposition has been used to reduce beam hardening distortions present in low and high energy (spectrum) images of dual-energy CT. Unfortunately, projection domain decomposition introduces strong negatively correlated noise between Compton scatter and photoelectric effect line integrals. A de-noising algorithm can be used to reduce the noise. However, reducing the low-frequency component of the noise with such a de-noising algorithm without smearing the image or introducing some bias can be challenging. Independent of this challenge, the non-linear projection domain decomposition of noisy input projection data leads, by itself, to noise induced bias. Part of this bias remains in-spite of applying a de-noising algorithm, propagates to the image, and can degrade the spectral image quality.

SUMMARY OF THE INVENTION

Aspects of the present application address the above-referenced matters and others.

The following describes an approach for mitigating beam hardening image distortions. Auxiliary variables in the low/high energy image domain, referred to herein as landmarks, are constructed to capture beam hardening distortions, expressed both by Hounsfield Unit (HU) shifts and by visible artifacts. Some of the landmarks estimate the change of values of each image pixel that corresponds to adding to it a small amount of a known material like soft tissue, bone, fat or iodine. Other landmarks are constructed corresponding to the elements of the base used for decomposition. As an example, these elements can be selected as the photoelectric effect and Scatter in water. These other landmarks help to estimate the pixel value for the hypothetical case in which the content of the pixel and its small neighborhood had been replaced by air. In addition, low and high energy images are reconstructed. The images and the landmarks are used to find the composition of each image pixel while avoiding the beam hardening distortions.

According to one aspect, a method includes generating a material landmark images in a low and high energy image domain. The material landmark image estimates a change of a value of an image pixel caused by adding a small amount of a known material to the pixel. The method further includes generating an air values image in the low and high energy image domain. The air values image estimates a value for each image pixel where a value of a pixel is replaced by a value representing air. The method further includes extracting from de-noised low and high images generated from the low and high line integrals, a material composition of each image pixel based on the material landmark images and air values image. The method further includes generating a signal indicative the extracted material composition.

In another aspect, a system includes a landmark processor configured to generate material landmarks and air values from a set of low and high energy line integrals. A material landmark estimates a change of a value of an image pixel that corresponds to adding a small amount of a known material to the pixel, and an air value estimates a value for the image pixel for a hypothetical case in which a content of the pixel is replaced by a value representing air. The system further includes a material classification and quantification processor configured to determine from de-noised low and high volumetric images generated with the set of low and high line integrals, a material composition of each image pixel based on the material landmarks and estimated air values, and generate a signal indicative the extracted material composition.

In another aspect, a computer readable storage medium is encoded with computer readable instructions, which, when executed by a processor of a computing system, causes the processor to: receive projection data from a scan; process the projection data into low and high spectrum images containing beam hardening image distortions; process the low and high spectrum projection data to determine a set of landmarks, and generate one or more of virtual monochromatic images, iodine maps, of virtual no contrast images free of beam hardening image distortions by processing the images reconstructed from the projection data based on the set of landmarks.

Still further aspects of the present invention will be appreciated to those of ordinary skill in the art upon reading and understand the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 1:
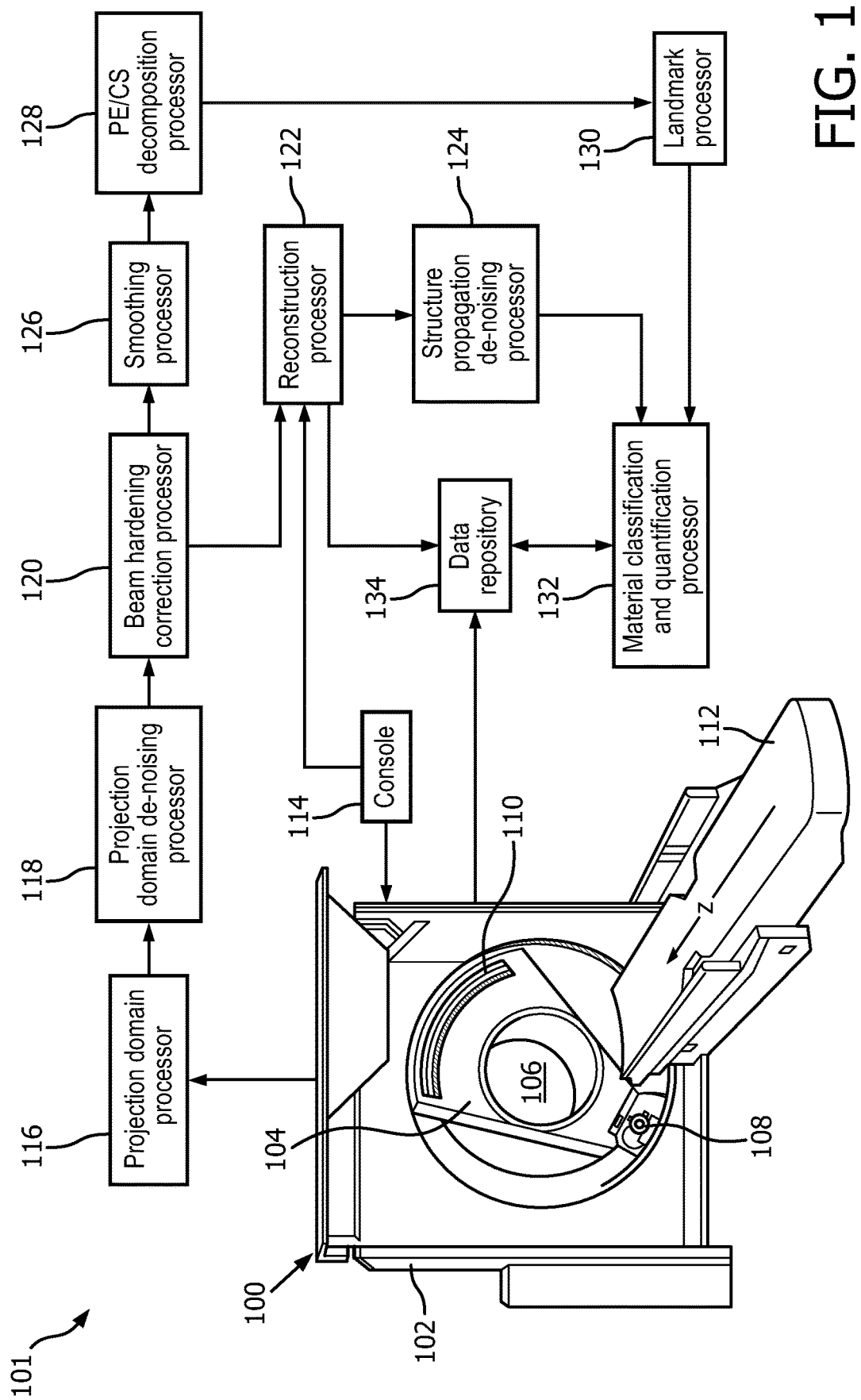
FIG. 1 schematically illustrates a system for generating and using landmarks.

FIG. 1 illustrates a system 101. The system 101 includes an imaging system 100, such as a computed tomography (CT) system.

The imaging system 100 includes a generally stationary gantry 102 and a rotating gantry 104, which is rotatably supported by the stationary gantry 102. The rotating gantry 104 rotates around an examination region 106 about a longitudinal or z-axis. A subject support 112, such as a couch, supports a subject or an object in the examination region 106. The subject support 112 is movable in coordination with scanning so as to guide the subject or object with respect to the examination region 106.

A radiation source 108, such as an x-ray tube, is supported by the rotating gantry 104 and emits radiation. In one instance, the radiation source 108 is configured to switch between at least two different peak emission spectra (e.g., 80 and 140 kVp) for scanning. In another instance, the system 100 includes multiple sources 108 in which one or more of the sources 108 may or may not be configured for kVp switching. In yet another embodiment, the source 108 is configured to emit a single broad spectrum.

A radiation sensitive detector array 110 includes a one or two dimensional array of detectors configured to detect radiation traversing the examination region 106 and generate projection data, or an electrical signal indicative thereof. The detectors may include conventional detectors or energy-resolving spectral detectors such as multi-layer detectors (in which each layer is configured to detect photons corresponding to different predetermined energy ranges), photon counting detectors, and/or other spectral detectors.

A computer serves as an operator console 114 and includes a human readable output device such as a monitor (e.g., LED, LCD, etc.) and an input device such as a keyboard and mouse. Software resident on the console 114 allows the operator to interact with the system 100 to control an operation of the system 100. For example, the software, when executed by a computer processor, may construct a soft control, via a GUI, which allows the user to select a spectral reconstruction algorithm.

A projection domain processor 116 composes the projection data into at least two energy dependent components such as low energy and high energy sets of line integrals.

A projection domain de-noising processor 118 can be used to de-noise the decomposed low and high energy line integrals. A suitable de-noising algorithm includes, but is not limited to, a total variation minimization and/or other algorithm. An example of a suitable algorithm is described in Brown et al., "Acceleration of ML iterative algorithms for CT by the use of fast start images," Proc. SPIE 8313, (2012).

A beam hardening correction processor 120 corrects the de-noised low and high energy line integrals for beam hardening artifact, producing beam hardened corrected, de-noised low and high energy line integrals. In one instance, the beam hardening processor 120 applies a water-based beam hardening correction such as polynomial or other based water-based beam hardening correction.

A reconstruction processor 122 reconstructs the beam hardened corrected, de-noised low and high energy line integrals from component 120, producing low and high energy volumetric images $I_{low,high}$.

A structure propagation de-noising processor 124 processes the low and high energy volumetric images, along with a single image created by combining the low and high energy volumetric images, producing de-noised low and high energy volumetric images $I_{low,high}^{denoised}$. An example of such de-noising approach is described in international application publication number WO 2014/128595, entitled "Structure Propagation Restoration for Spectral CT," and filed on Feb. 11, 2014, the entirety of which is incorporated herein by reference. Other approaches are also contemplated herein.

A smoothing processor 126 smooths the beam hardened corrected, de-noised low and high energy line integrals, producing smoothed low and high energy line integrals $P_{low,high}^{3D,smoothed}$. In one instance, the smoothing processor is implemented as a filter that convolves the beam hardened corrected, de-noised low and high energy line integrals with a space invariant and/or other filter. An example of a space invariant filter is a box filter with 3, 5, 7, etc. bins along the detector arc, detector rows and views, correspondingly.

A photoelectric effect/Compton scatter (PE/CS) decomposition processor 128 decomposes the smoothed low and high energy line integrals into 3D smoothed photoelectric effect and Compton scatter equivalent path sinograms $ep_{photo,scatter}^{3D,smoothed}$. As opposed to the decomposition discussed for example in Alvarez et al., Phys. Med. Biol. 21, 733 (1976), the 3D smoothed photoelectric effect and Compton scatter sinograms are free of the noise induced bias and/or the negatively correlated noise.

It is to be appreciated that the smoothing of the low and high line integrals is allowed since both landmarks and air values calculated from these equivalent path sinograms vary in typical frequencies that are smaller than a few line pairs per cm.

A landmark processor 130 processes the 3D smoothed photo/scatter equivalent path sinograms and generates landmark volumetric images $L_{low,high}^{m}$. As described in greater detail below, this includes generating landmark images for both a material and base elements, and then using these landmarks to classify and quantify a material in each pixel. Generally, landmarks represent points for locations of different materials on a multi-energy Hounsfield unit (HU) space. The value of each pixel in these images is calculated for different materials such as soft tissue, fat, bone, iodine, or decomposition base elements. It gives the increase of HU in the pixel that corresponds to adding a small and known concentration of the material or base element to the pixel and its small neighborhood.

A material classification and quantification processor 132 processes the de-noised low and high energy images $I_{low,high}^{denoised}$ and the landmark volumetric images $L_{low,high}^{m}$, and produces one or more of virtual monochromatic images, iodine maps, virtual no contrast images, iodine to calcium classification, and/or other images. An example of the material classification and quantification is discussed in greater detail below. It is to be appreciated that by employing the approach described herein, beam hardening image distortions are mitigated from being in the low- and high-spectrum images, avoiding the negative side effects of the projection de-composition described herein.

A data repository 134 stores electronically formatted data, including one or more of the projection data generated by the detector array 110, the pair of low and high energy images, the air value images, the landmarks, the material classification and quantification results, etc. Examples of the data repository includes a picture archiving and communication system (PACS), radiology information system (RIS), a hospital information system (HIS), an electronic medical record (EMR), a database, a server, etc.

It is to be appreciated that one or more of the processors 116, 118, 120, 122, 124, 126, 128, 130, or 132 can be implemented via one or more computer processors (e.g., a microprocessor, a central processing unit, etc.) executing one or more computer readable and/or executable instructions embedded or encoded on non-transitory computer readable storage medium such as physical memory. One or more of the processors 116-132 can be part of the console 114, a computing system remote from the system 101, distributed across a plurality of devices, etc. Additionally or alternatively, at least one of instructions can be carried by transitory medium such as a signal.

Figure 2:
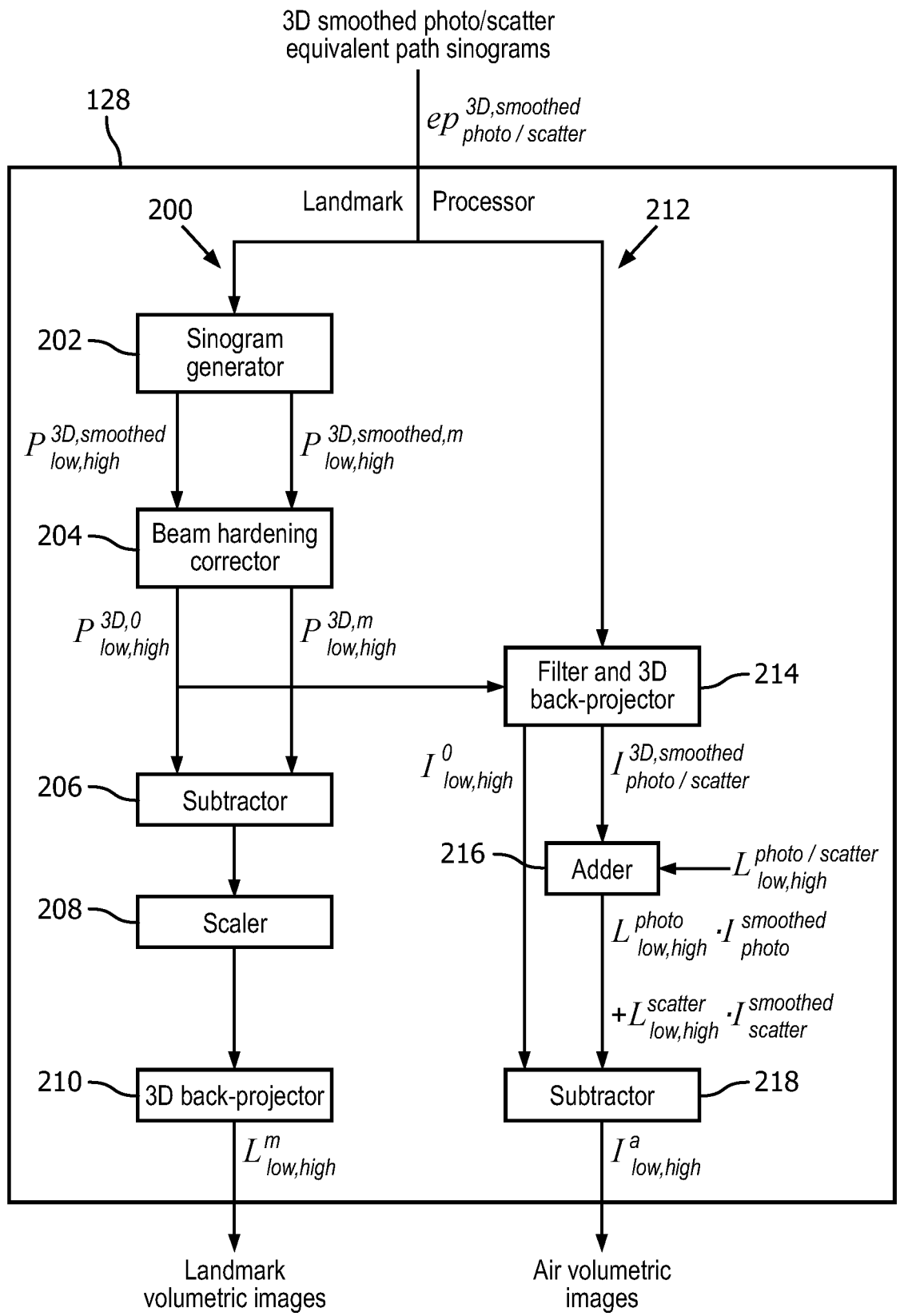
FIG. 2 schematically illustrates an example landmark determiner.

FIG. 2 schematically illustrates an example of the landmark processor 130 for generating landmarks in the 3D domain. The landmark processor 130 receives, as input, the 3D smoothed photo/scatter equivalent path sinograms $ep_{photo,scatter}^{3D,smoothed}$. The landmark processor 130 includes two processing chains 200 and 212.

The processing chain 200 determines landmark volumetric images $L_{low,high}^{m}$. The value of each pixel in these images is calculated for different materials such as soft tissue, fat, and bone, iodine, or decomposition base elements, indexed with superscript m. It gives the increase of HU in the pixel that corresponds to adding a small and known concentration of the material or base element to the pixel and its small neighborhood. The processing chain 212 determines air volumetric images $I_{low,high}^{a}$ by estimating a value of every pixel within the low and high images for the hypothetical case in which the content of the pixel and its neighborhood is replaced by air.

The processing chain 200 includes a sinogram generator 202 that utilizes a model estimation for the low/high spectra to generate 3D smoothed low/high sinograms $P_{low,high}^{3D,smoothed}$, for example, as shown in EQUATION 1:

$$P_{low,high}^{3D,smoothed}(c, r, v) = \qquad \text{EQUATION 1}$$
$$-\log\left(\frac{\int_0^\infty dES(E) \cdot F_{low,high}(E, c, r) \cdot \exp(x^0)}{\int_0^\infty dES(E) \cdot F_{low,high}(E, c, r)}\right),$$

where $x^0 = -\mu_{photo}^{water}(E) \cdot ep_{photo}^{3D,smooth}(c,r,v) - \mu_{scatter}^{water}(E) \cdot ep_{scatter}^{3D,smoothed}(c,r,v)$, c,r,v represents detector column, detector row and view number of a given reading within the 3D sinogram, S(E) is the contribution of a photon of energy E that is absorbed by the detector to the electronic signal, $F_{low,high}(E,c,r)$ represents the flux of photons of energy E belonging to the low or the high spectra to be absorbed in the detector during air scan, and $\mu_{photo,scatter}^{water}(E)$ is the water energy dependent photo and scatter attenuation mechanisms.

The sinogram generator 202, in parallel, also utilizes the model estimation for the low/high spectra to generate 3D smoothed material low/high sinograms with an additional intersection path δ through the landmark material or base element $P_{low,high}^{3D,smoothed,m}$, for example, as shown in EQUATION 2:

$$P_{low,high}^{3D,smoothed,m}(c, r, v) = \qquad \text{EQUATION 2}$$
$$-\log\left(\frac{\int_0^\infty dES(E) \cdot F_{low,high}(E, c, r) \cdot \exp(x^m)}{\int_0^\infty dES(E) \cdot F_{low,high}(E, c, r)}\right),$$

wherein $x^m = -\mu_{photo}^{water}(E) \cdot ep_{photo}^{3D,smoothed}(c,r,v) - \mu_{scatter}^{water}(E) \cdot ep_{scatter}^{3D,smoothed}(c,r,v) - \mu^m(E) \cdot \delta$, $\mu^m(E)$ stands both for the energy dependent total attenuation profile of the material associated with the landmark and for the attenuation profile of the base element, i.e. $\mu_{photo/scatter}^{water}(E)$. In EQUATION 2, accurate material total attenuation profiles, without approximating them according to a two-base model, are used. This may lead to an improved material classification and quantification compared to a conventional projection decomposition approach.

A beam hardening corrector 204 applies a water-based beam hardening correction on $P_{low,high}^{3D,smoothed}$ to generate beam hardening corrected 3D low/high sinograms $P_{low,high}^{3D,0}$ and on $P_{low,high}^{3D,smoothed,m}$ to generate beam hardening corrected 3D material low/high sinograms $P_{low,high}^{3D,m}$.

A subtractor 206 calculates a difference between $P_{low,high}^{3D,m}$ and $P_{low,high}^{3D,0}$.

A scaler 208 scales the difference by multiplying the difference by 1000/(0.0192/mm·δ), where 0.0192 times 1/mm stands for the adopted number for the total attenuation of water.

A 3D back-projector 210 back-projects the scaled difference, denoted by $P_{low,high}^{3D,diff,m}$, generating the landmark volumetric images $L_{low,high}^{m}$. In one instance, the back-projector 210 employs the same weights used to reconstruct the low and high energy volumetric images output by the structure propagation de-noising processor 124.

In another embodiment described in EQUATION 3, the scaled difference $P_{low,high}^{3D,diff,m}$ can be obtained without splitting the calculation to two channels in 202 and 204 resulting in $P_{low,high}^{3D,m}$ and $P_{low,high}^{3D,0}$. Here $BH_{low,high}^{n}(c,r)$ are the beam hardening correction polynomial coefficients and $\mu^m(E)$ is the attenuation profile of the material m.

$$P_{low,high}^{3D,diff,m} = \qquad \text{EQUATION 3}$$
$$\lim_{\delta \to 0} \frac{1000}{0.0192} \cdot \sum_n BH_{low,high}^n(c,r) \cdot n \cdot \left(P_{low,high}^{3D,smoothed}\right)^{n-1} \cdot$$
$$\frac{\int_0^\infty dES(E) \cdot F_{low,high}(E, c, r) \cdot \exp(x^0) \mu^m(E)}{\int_0^\infty dES(E) \cdot F_{low,high}(E, c, r) \cdot \exp(x^0)}.$$

Figure 3:
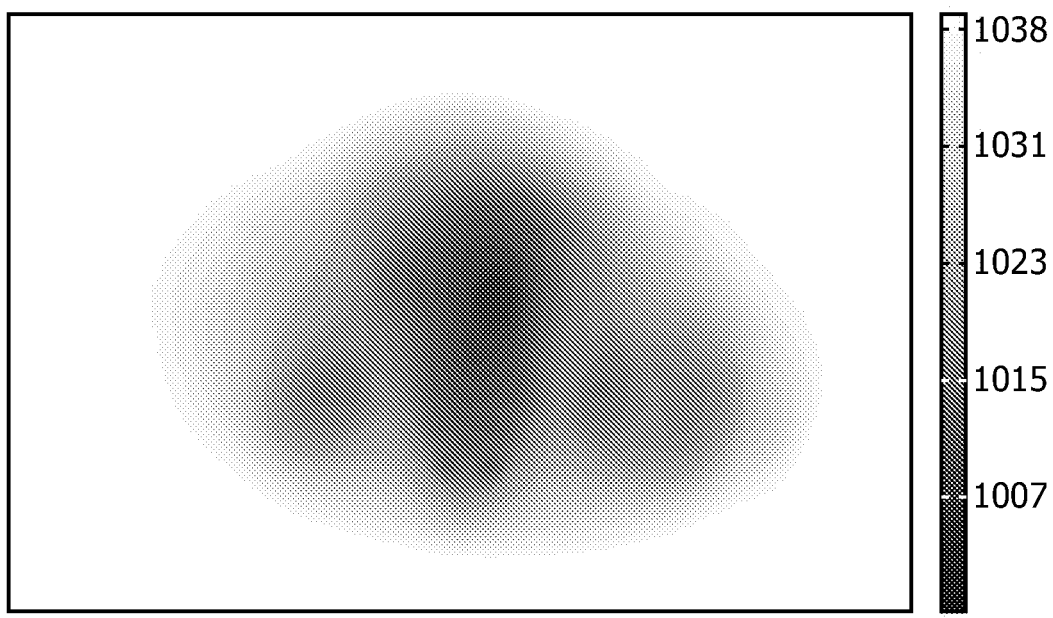
FIG. 3 shows a low-spectrum coordinate of a bone landmark within an axial image slice.
Figure 4:
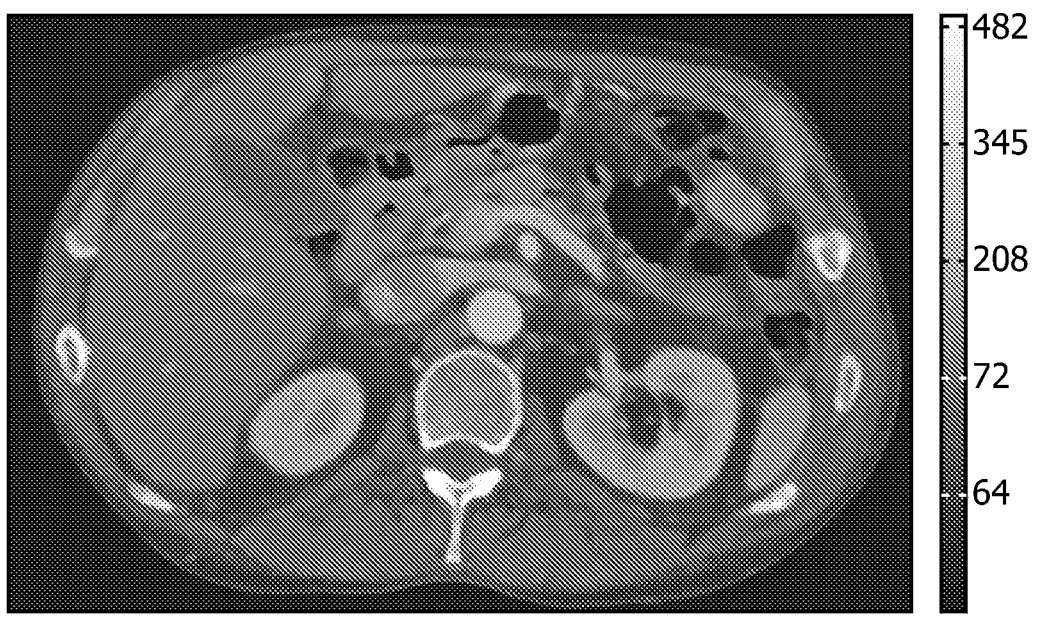
FIG. 4 shows a low-spectrum image of the same axial image slice as shown in FIG. 3.

The landmarks vary slowly within the image domain. An example of this is shown in FIG. 3, which shows the low-spectrum coordinate of the bone landmark $L_{low}^{bone}$ within an axial image slice. In this example, the bone molecule is Ca4P3O13H at 1 g/cc. FIG. 4 shows the low-spectrum image of the same image slice.

Returning to FIG. 2, the second processing chain 212 includes a filter and 3D back-projector 214 that filters and back-projects the beam hardening corrected 3D low/high sinograms $P_{low,high}^{3D,0}$ producing low and high energy smoothed volumetric images $I_{low,high}^{0}$. In one instance, the back-projector 210 employs the same weights used to reconstruct the low and high energy volumetric images output by the structure propagation de-noising processor 124. The filter and 3D back-projector 214 also filters and back-projects $ep_{photo/scatter}^{3D,smoothed}$, producing 3D smoothed photo and scatter volumetric images $I_{photo/scatter}^{3D,smoothed}$. These images give, for each pixel, the strength of the photo/scatter mechanism in the pixel divided by that of a water pixel.

An adder 216 adds the landmarks corresponding to the decomposition base elements $L_{low,high}^{photo/scatter}$ to $I_{photo/scatter}^{3D,smoothed}$, producing $L_{low,high}^{photo} \cdot I_{photo}^{smoothed} + L_{low,high}^{scatter} \cdot I_{scatter}^{smoothed}$, where "·" stands for a pixel by pixel multiplication.

A subtractor 218 generates the air volumetric images $I_{low,high}^{a}$ as a difference between $I_{low,high}^{0}$ and $L_{low,high}^{photo} \cdot I_{photo}^{smoothed} + L_{low,high}^{scatter} \cdot I_{scatter}^{smoothed}$ as shown as shown in EQUATION 4:

$$I_{low,high}^{a} = I_{low,high}^{0} - L_{low,high}^{photo} \cdot I_{photo}^{smoothed} - L_{low,high}^{scatter} \cdot I_{scatter}^{smoothed}. \quad \text{EQUATION 4:}$$

The air volumetric images $I_{low,high}^{a}$ are not necessarily zero since the low and high images are contaminated by beam hardening artifacts, as opposed to the photo/scatter images.

Figure 5:
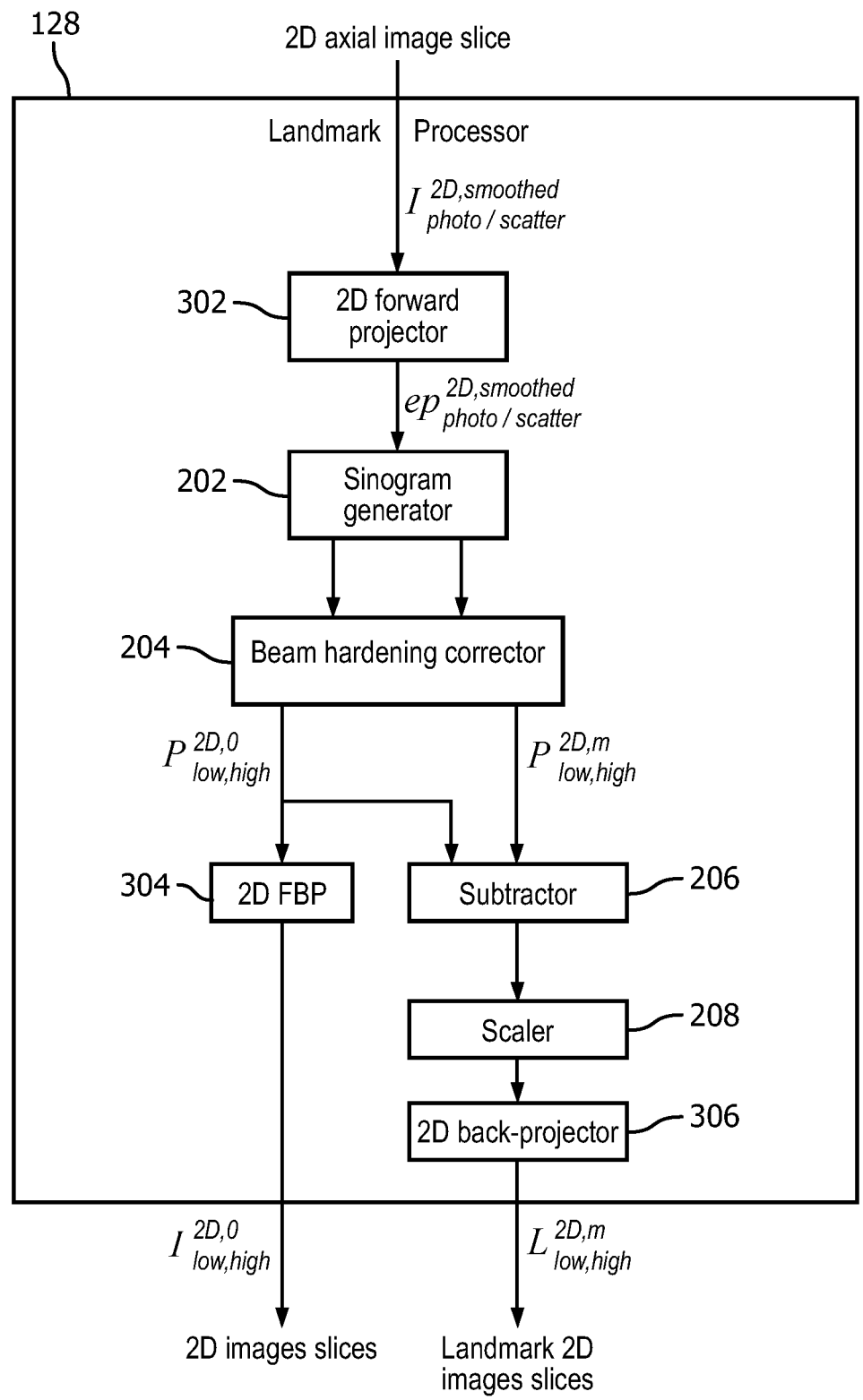
FIG. 5 schematically illustrates a variation of landmark determiner.

FIG. 5 schematically illustrates a variation in which landmark images and air images are generated in the 2D domain, e.g., sequentially for each axial 2D slice of the volumetric image. In FIG. 5, $I_{photo/scatter}^{2D,smoothed}$ is a 2D axial image slice of $I_{photo/scatter}^{smoothed}$. A forward projector 302 forward projects $I_{photo/scatter}^{smoothed}$ producing $ep_{photo/scatter}^{2D,smoothed}$, which replaces $ep_{photo/scatter}^{3D,smoothed}$ in EQUATIONS 1 and 2. A 2D FBP 304 produces the 2D images slices $I_{low,high}^{2D,0} \cdot I_{low,high}^{2D,0}$ replace $I_{low,high}^{0}$ in FIG. 2. A 2D back-projector 306 produces the 2D landmark images slices $L_{low,high}^{2D,m}$.

Choosing small values for δ in FIGS. 2 and 5, e.g. 1 mm, the landmarks equal mathematically to the derivative of the low/high images pixel value with respect to the content of the material or base element within it. For EQUATION 4, this derivative for materials like iodine and bone is fixed within an approximation for different concentrations of these materials within the pixel. The small inaccuracy involved within this approximation can be reduced furthermore by a correction. An example correction is discussed in connection with FIG. 6.

An x-axis 602 represents the low-spectrum coordinate of an iodine landmark $L_{low}^{iodine}$ within 2D image pixels. A y-axis 604 is the same coordinate, calculated using the configuration of FIG. 2 only that here, the values of $I_{photo,scatter}^{smoothed}$ within a small spherical neighborhood of about 20 mm diameter around the pixel are reduced by 50% with the intension of averaging better $L_{low}^{iodine}$ with respect to the pixel content.

Figure 6:
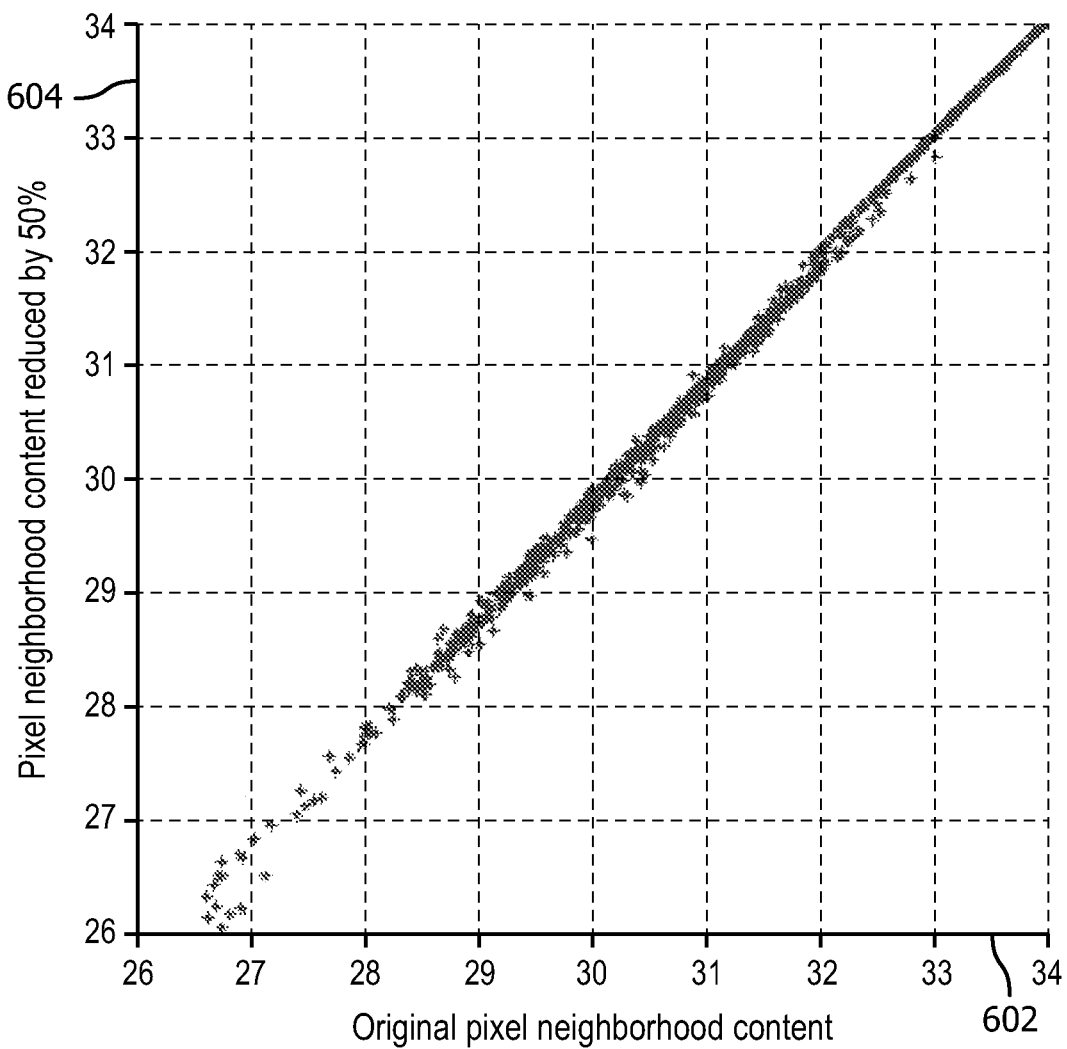
FIG. 6 illustrates a graph of iodine landmark low-spectrum coordinates.

As shown in FIG. 6, calculating $L_{low}^{iodine}$ in both ways leads to about the same results at large values. However, at its lowest values, $L_{low}^{iodine}$ becomes smaller by up to about 2% with respect to its values obtained by the better averaging. To mitigate this small inaccuracy, similar graphs can be calculated for all material and base element landmarks coordinates. Pre-calculating standard polynomial fits to these graphs can be used to map the landmark values obtained in FIG. 2 into more accurate landmarks values based on these polynomials.

Next, an example of the material classification and quantification processor 130 is discussed in connection with FIG. 7. For the dual-energy scanner, the content of each pixel is considered to be a mixture of two materials.

The landmarks $L_{low,high}^{m}$ and the estimated air values $I_{low,high}^{a}$ are utilized in this example to find which the two materials within each pixel are. FIG. 7 includes a soft-tissue landmark 702, a bone landmark 704, and an iodine landmark 706, each corresponding to typical concentrations of these materials. In this example, beginning points of the iodine and bone landmarks 706 and 704 are at an end point of the soft-tissue landmark 702, as shown at 708. The regions 710 give the low/high coordinates of the original low/high images $I_{low,high}^{denoised}$ (pix) after subtracting from them the low and high coordinates of $I_{low,high}^{a}$ at each pixel.

In this example, the material classification and quantification processor 132 determines, for each pixel, whether it contains calcium or iodine in addition to soft tissue. For this determination, the processor 132 uses not only the points with shifted coordinates given by $I_{low,high}^{denoised}$ (pix)−$I_{low,high}^{a}$ (pix), but also the slope of the line that connects between groups of these points corresponding to neighbor pixels. These lines are found to parallelize the iodine or the calcium landmarks, depending on which of these materials is within the given group of pixels.

Figure 7:
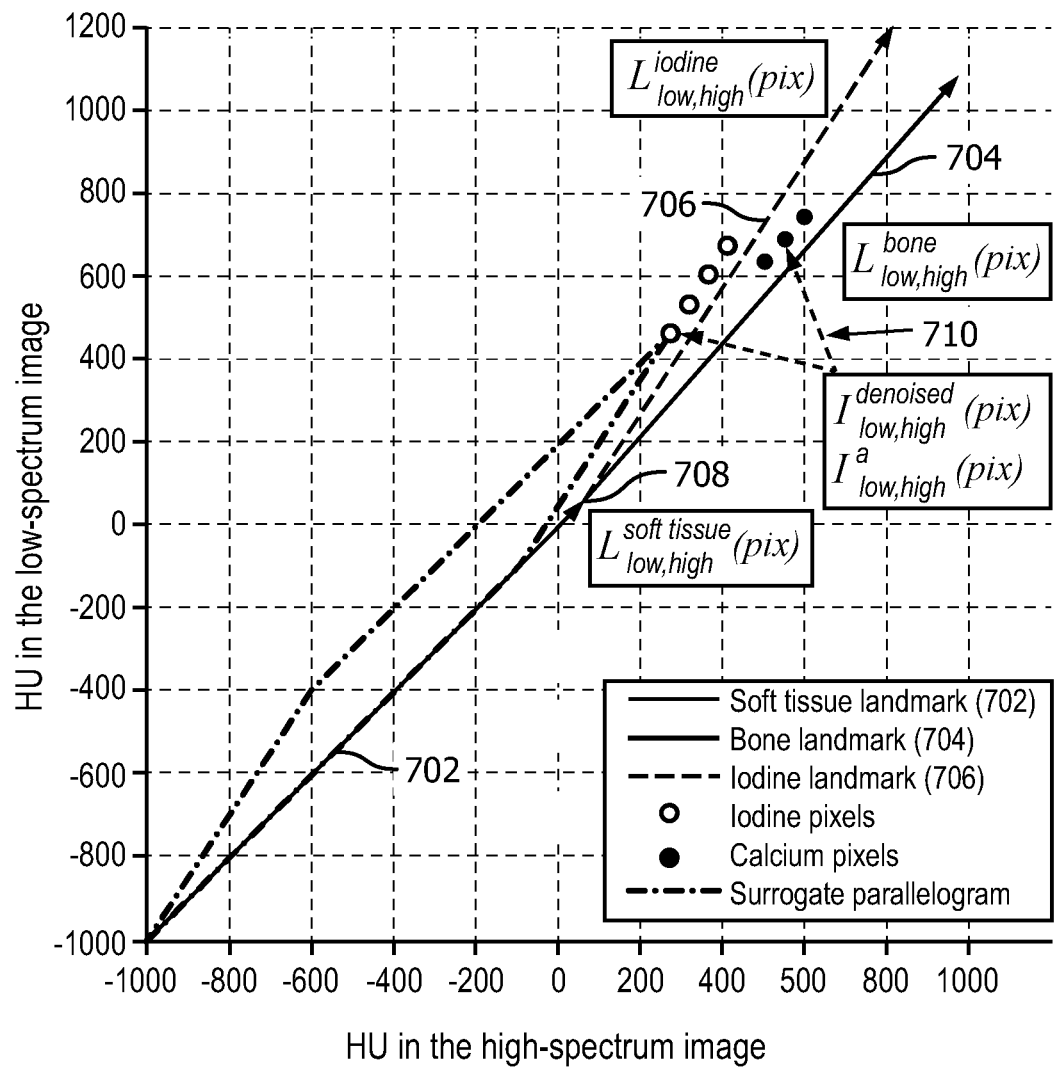
FIG. 7 illustrates an example HU-HU scatter plot.

According to the position of a lower left point that represents a pixel in FIG. 7, together with line that connects this point to the points representing neighboring pixels, the processor 132 concludes that the pixel represented by this point contains a mixture of soft-tissue and iodine. The processor 132 take the concentration of each of these two materials within the pixels denoted by $C_{w/i}$(pix) as the two unknown variables that solve the system of two linear equations in EQUATION 5:

$$I_{low}^{denoised}(pix) = I_{low}^{a}(pix) + \sum_{m=w,i} L_{low}^{m}(pix) \cdot C_{m}(pix)/C^{L,m}, \quad \text{EQUATION 5}$$

$$I_{high}^{denoised}(pix) = I_{high}^{a}(pix) + \sum_{m=w,i} L_{high}^{m}(pix) \cdot C_{m}(pix)/C^{L,m}.$$

where $C^{L,m=w/i}$ represents the known concentrations selected for calculating the landmarks $L_{low,high}^{m=w/i}$(pix).

Solving EQUATION 5 is equivalent to the parallelogram method, i.e. expressing the point position as a linear combination of two parallelogram neighbor facets that are parallel to the water and iodine landmarks and sum up to the position of the spot with respect to air (−1000,−1000). The length of each facet, divided by the length of its corresponding landmark, gives us the ratio between the water/iodine concentration in the pixel $C_{w/i}$(pix), and the known concentration $C^{L,m=w/i}$.

For explanatory purposes, the above is described for the dual-energy case. However, it is to be understood that EQUATIONS 1-5 can be utilized for N>2 spectral windows, together with N candidate materials for each pixel and N base elements by a straight forward manner.

Figure 8:
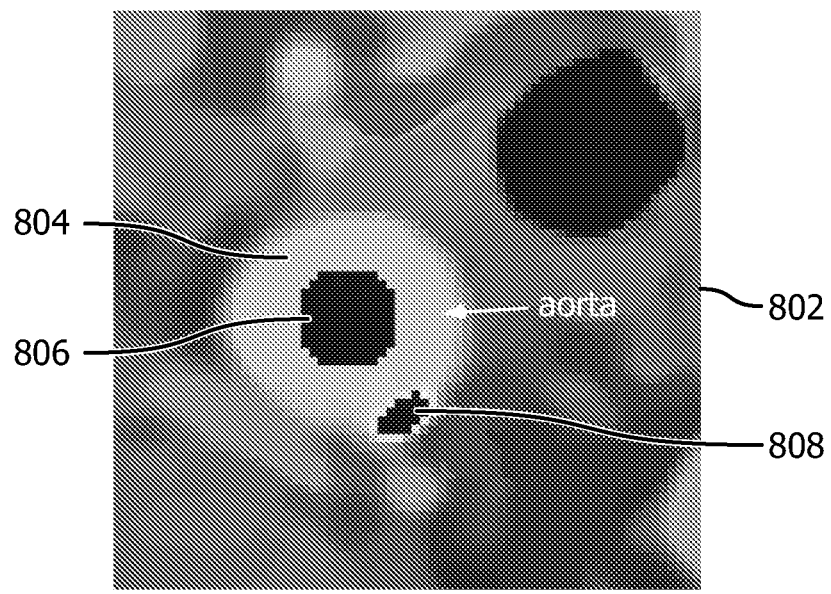
FIG. 8 illustrates a sub-portion of an image.
Figure 9:
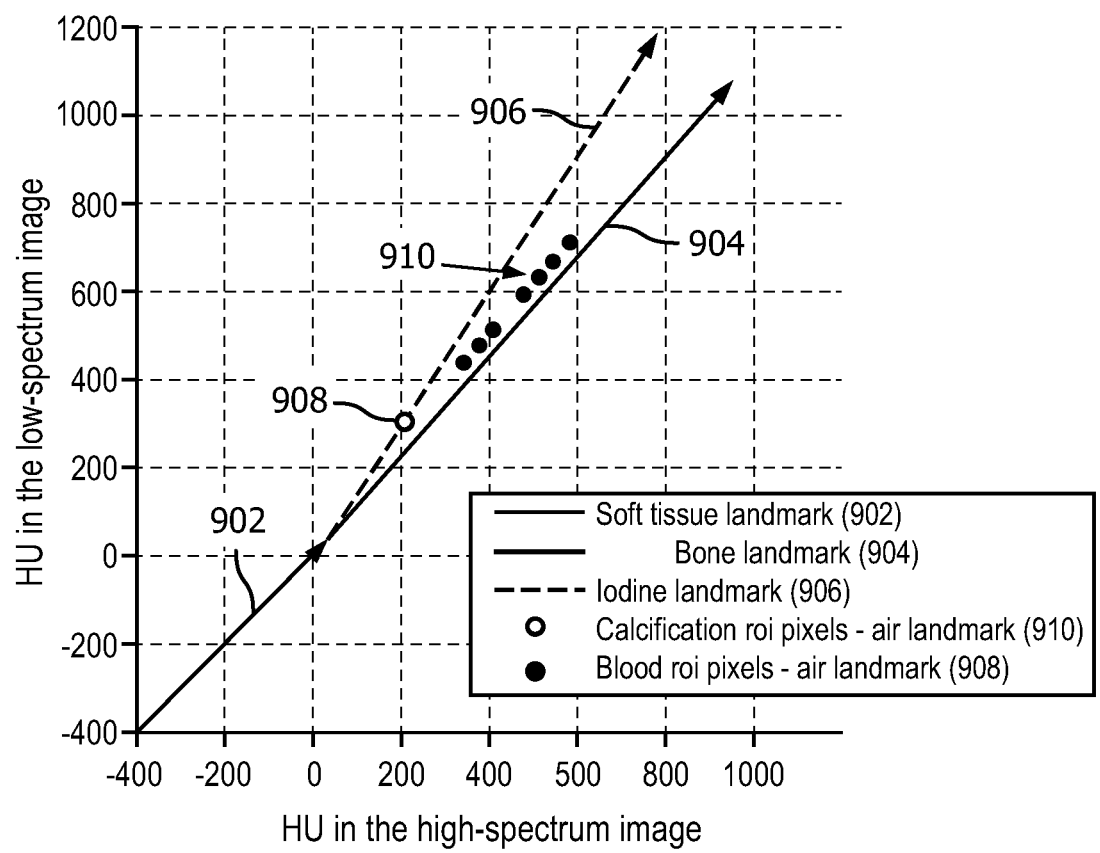
FIG. 9 illustrates another example HU-HU scatter plot.

FIGS. 8 and 9 illustrates show an example.

FIG. 8 shows a portion of an image 802 depicting a cross section of an aorta 804, showing blood 806 and calcified plaque 808. FIG. 9 shows soft-tissue, bone and iodine landmarks 902, 904 and 906 calculated for a pixel at a plaque ROI center, on top of those calculated for the pixel at the center of the blood ROI. The pixels within the blood ROI are plotted at 908, and the pixels with plaque are plotted at 910. The blood pixels at 908 fall on the iodine line 906. The plaque pixels at 910 do not fall on the bone line 904, since their soft-tissue content is different from that within blood. Nevertheless, they can still be identified as belonging to a calcified plaque based on the slope of the line that connects them. Their scatter can be attributed not to noise, which is very small, but to a change between their calcium concentrations.

This interpretation is based on observing scatter plots of bony pixels at other organs like the vertebra. Like for the vertebra, a linear fit of this scatter is expected to be parallel to the calcium landmark. In practice, studying various calcifications in different patients, it has been found that this linear fit has a slope shifted by +0.9±0.4° from that of the calcium landmark. This shift attributed to an imperfect spectral model is yet much smaller in magnitude than that of the shift with respect to the iodine landmark given by −7.3±1.1°. The ability to classify this way properly between the calcified and the iodine pixels requires both noise suppression, accurate elimination of beam hardening artifacts, and introducing no bias during projection de-composition or any de-noising step. The approached described herein offers all these benefits.

Figure 10:
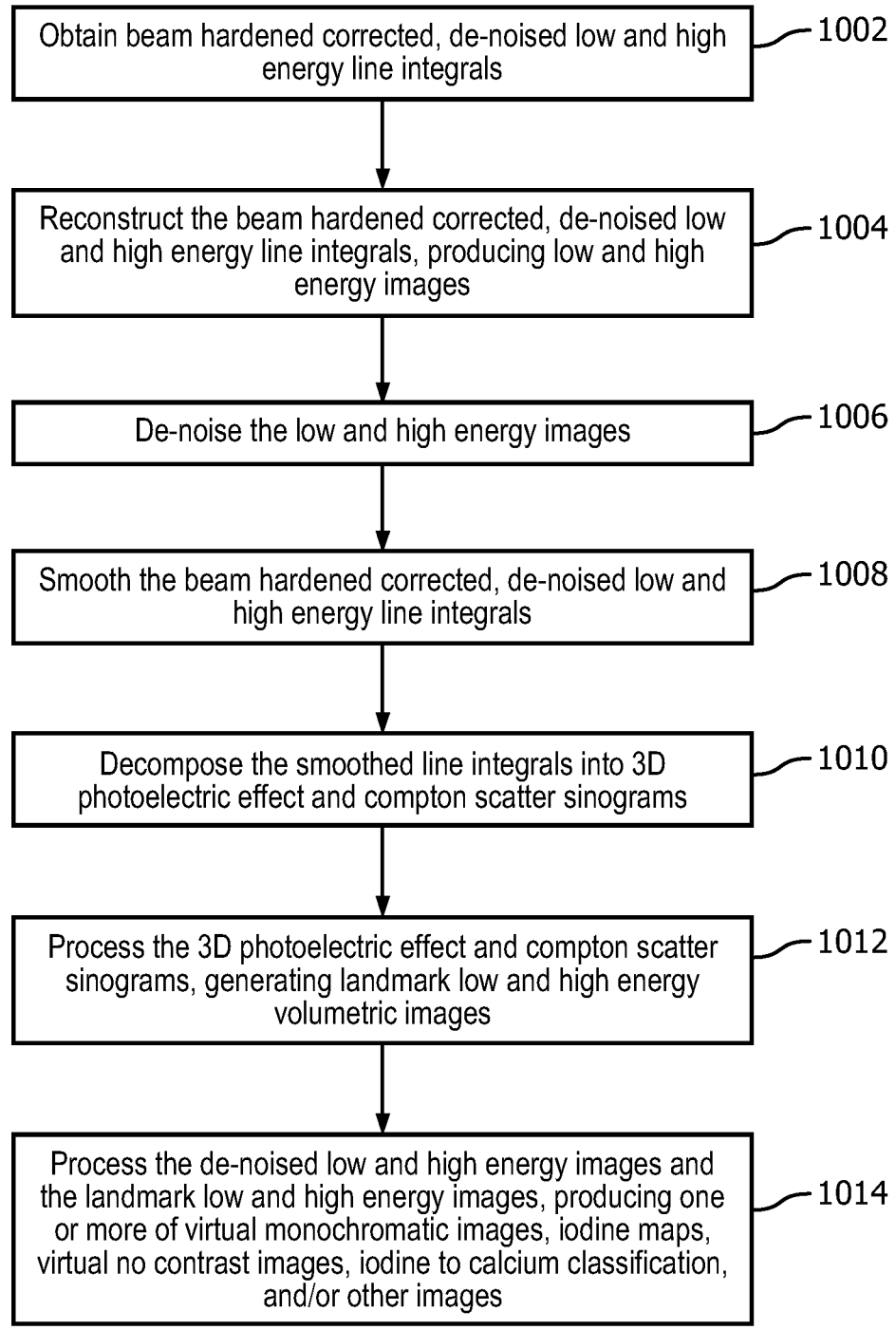
FIG. 10 illustrates an example method for generating and using landmarks.

FIG. 10 illustrates a method for employing the landmark approach described herein.

At 1002, beam hardened corrected, de-noised low and high energy line integrals are obtained. These can be obtained as discussed herein via the beam hardening correction processor 120, the data repository 134, and/or otherwise.

At 1004, the beam hardened corrected, de-noised low and high energy line integrals are reconstructed, producing low and high energy volumetric images.

At 1006, the low and high energy volumetric images are processed, producing de-noised low and high energy volumetric images.

At 1008, the beam hardened corrected, de-noised low and high energy line integrals are smoothed, producing smoothed low and high energy line integrals.

At 1010, the smoothed low and high energy line integrals are decomposed into 3D smoothed photoelectric effect and Compton scatter sinograms.

At 1012, the 3D smoothed photoelectric effect and Compton scatter sinograms are processed, as described herein, generating material and base element landmark images. This includes air value images in which the value within each pixel is the estimated hypothetical value with a content of the pixel replaced by a value representing air.

At 1014, the de-noised low and high energy images and the landmark low and high energy images are processed, producing one or more of virtual monochromatic images, iodine maps, virtual no contrast images, iodine to calcium classification, and/or other images, as described herein.

The above may be implemented by way of computer readable instructions, which when executed by a computer processor(s), cause the processor(s) to carry out the described acts. In such a case, the instructions can be stored in a computer readable storage medium associated with or otherwise accessible to the relevant computer. Additionally or alternatively, one or more of the instructions can be carried by a carrier wave or signal.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A method, comprising:
   generating a material landmark image in a low and high energy image domain, wherein the material landmark image estimates a change of a value of an image pixel caused by adding a small amount of a known material to the pixel;
   generating an air values image in the low and high energy image domain, wherein the air values image estimates a value for each image pixel where a value of a pixel is replaced by a value representing air;
   extracting from de-noised low and high energy images generated from low and high energy line integrals, a material composition of each image pixel based on the material landmark images and air values image; and
   generating a signal indicative of the extracted material composition.

2. The method of claim 1, wherein the de-noised low and high energy volumetric images include beam hardening distortions, and the material composition is free of the beam hardening distortions.

3. The method of claim 1, further comprising:
   receiving projection data, which are generated by a detector array of an imaging system in response to scanning an object with the imaging system;
   processing the projection data, which produces low and high energy line integrals;
   de-noising the low and high energy line integrals, which produces de-noised low and high energy line integrals; and
   processing the de-noised low and high energy line integrals to correct for image beam hardening distortions.

4. The method of claim 1, further comprising:
   smoothing the low and high energy line integrals, which produces smoothed low and high energy line integrals; and
   decomposing the smoothed low and high energy line integrals into 3D smoothed photoelectric effect and Compton scatter sinograms.

5. The method of claim 4, wherein photoelectric effect and Compton scatter equivalent paths are free of noise induced bias and negatively correlated noise.

6. The method of claim 4, wherein generating the landmark volumetric images comprises:
   generating, from the 3D smoothed photoelectric effect and Compton scatter sinograms, 3D smoothed low and high energy sinograms and 3D smoothed material low and high energy sinograms;
   beam hardening correcting the 3D smoothed low and high energy sinograms and the 3D smoothed material low and high energy sinograms, producing 3D low and high energy sinograms and 3D material low and high energy sinograms;
   determining a difference between the 3D low and high energy sinograms and 3D material low and high energy sinograms;
   scaling the difference; and
   back-projecting the scaled difference, which produces the landmark volumetric image.

7. The method of claim 4, wherein generating the landmark volumetric images comprises: a direct calculation of the scaled 3D material low and high energy sinograms of differences as the derivative of the 3D material low and high energy sinograms with respect to an additional intersection path through the material.

8. The method of claim 6, wherein generating the air values images comprises:
   filter-back-projecting the smoothed 3D low and high energy sinograms, producing smoothed low and high energy volumetric images;
   back-projecting the 3D smoothed photoelectric effect and Compton scatter sinograms, producing 3D smoothed photo and scatter volumetric images;
   generating volumetric landmark images for base-elements used for decomposition; and
   generating the air volumetric image based on the smoothed low and high energy volumetric images, the base-element volumetric landmark images, and the 3D smoothed photo and scatter volumetric images.

9. The method of claim 3, further comprising:
reconstructing the set of low and high energy line integrals, which produces a set of low and high energy volumetric images; and
de-noising the set of low and high energy volumetric images, which produces the de-noised low and high energy volumetric images.

10. The method of claim 9, further comprising:
constructing a 2D HU/HU scatter plot with the de-noised low and high energy volumetric images and the landmark and air values volumetric images; and
determining the material composition based on the 2D HU/HU scatter plot.

11. The method of claim 1, further comprising:
receiving 2D smoothed photo and scatter image slices;
forward projecting the 2D smoothed photo and scatter image slices, producing 2D smoothed photo and scatter sinograms;
generating 2D smoothed low and high energy sinograms based on the 2D smoothed photo and scatter sinograms;
back-projecting the 2D smoothed low and high energy sinograms, producing 2D smoothed low and high energy image slices;
generating 2D material low and high energy sinograms based on the 2D smoothed photo and scatter sinograms;
generating 2D base-element low and high energy sinograms based on the 2D smoothed photo and scatter sinograms;
determining a difference between the 2D smoothed low and high energy sinograms and the 2D material and base-element low and high energy sinograms;
scaling the difference;
back-projecting the difference, producing landmark 2D image slices; and
generating 2D air values images based on the 2D base-element images, the 2D smoothed low and high energy images and the smoothed 2D photo and scatter images.

12. The method of claim 1, further comprising:
generating at least one of a virtual monochromatic image, an iodine map, a virtual no contrast images, and an iodine to calcium classification based on the signal.

13. A system, comprising:
a landmark processor configured to generate material landmarks and air values from a set of low and high energy line integrals, wherein a material landmark estimates a change of a value of an image pixel that corresponds to adding a small amount of a known material to the pixel, and an air value estimates a values for the image pixel for a hypothetical case in which a content of the pixel is replaced by a value representing air; and
a material classification and quantification processor configured to determine from de-noised low and high energy volumetric images generated with the set of low and high energy line integrals, a material composition of each image pixel based on the material landmarks and estimated air values, and generate a signal indicative the extracted material composition.

14. The system of claim 13, further comprising:
a projection domain processor configured to compose projection data and produce composed low and high energy line integrals;
a projection domain de-noising processor configured to de-noise the composed low and high energy line integrals and produce de-noised composed low and high energy line integrals; and
a beam hardening correction processor configured to process the de-noised composed low and high energy line integrals to correct for beam hardening distortions and produce the set of low and high energy line integrals.

15. The system of claim 13, further comprising:
a smoothing processor configured to smooth the set of low and high energy line integrals, which produces smoothed low and high energy line integrals; and
a PE/CS decomposition processor configured to decompose the smoothed low and high energy line integrals into 3D smoothed photoelectric effect and Compton scatter sinograms.

16. The system of claim 15, wherein the landmarks processor comprises:
a sinogram generator configured to process the 3D smoothed photoelectric effect and Compton scatter sinograms and generate 3D smoothed low and high energy sinograms and 3D smoothed material and base-element low and high energy sinograms;
a beam hardening corrector configured to process the beam hardening correcting the 3D smoothed low and high energy sinograms and the 3D smoothed material and base-element low and high energy sinograms and produce 3D smoothed low and high energy sinograms and 3D smoothed material low and high energy sinograms;
a subtractor configured to determine a difference between the 3D smoothed low and high energy sinograms and 3D smoothed material and base-element low and high energy sinograms;
a scaler configured to scale the difference; and
a back-projector configured to back-project the scaled difference and produce the landmark volumetric images.

17. The system of claim 16, wherein the scaler scales the difference by multiplying the difference by $1000/(0.0192/\text{mm}\cdot\delta)$, where $\delta$ represents an additional intersection path through the landmark material or base element.

18. The system of claim 16, wherein the landmarks processor further comprises:
a filter and 3D back-projector configured to filter and back-project the 3D smoothed low and high energy sinograms, producing smoothed low and high energy volumetric images, and the 3D smoothed photoelectric effect and Compton scatter sinograms, producing 3D smoothed photo and scatter volumetric images;
an adder that adds the 3D smoothed photoelectric effect and Compton scatter sinograms and landmark photo scatter low and high energy images; and
a subtractor that subtracts the output of the adder from the smoothed low and high energy volumetric images, producing the air volumetric images.

19. The system of claim 13, further comprising:
a reconstruction processor configured to reconstruct the set of low and high energy line integrals, which produces low and high energy volumetric images; and
a de-noising processor configured to de-noise the low and high energy images, which produces the de-noised low and high energy volumetric images.

20. The system of claim 19, wherein the material classification and quantification processor constructs a 2D HU/HU scatter plot with the landmark and air values volumetric images and the de-noised low and high energy volumetric images and determines the material composition based on the 2D HU/HU scatter plot.

21. A non-transitory computer-readable medium having one or more executable instructions stored thereon, which, when executed by at least one processor, cause the at least one processor to perform a method comprising:

generating a material landmark image in a low and high energy image domain, wherein the material landmark image estimates a change of a value of an image pixel caused by adding a small amount of a known material to the pixel;

generating an air values image in the low and high energy image domain, wherein the air values image estimates a value for each image pixel where a value of a pixel is replaced by a value representing air;

extracting from de-noised low and high energy images generated from low and high energy line integrals, a material composition of each image pixel based on the material landmark images and air values image; and generating a signal indicative the extracted material composition.

* * * * *